Oct. 6, 1953  L. V. MOLENAAR  2,654,590
GRAIN DRIER
Filed March 26, 1951
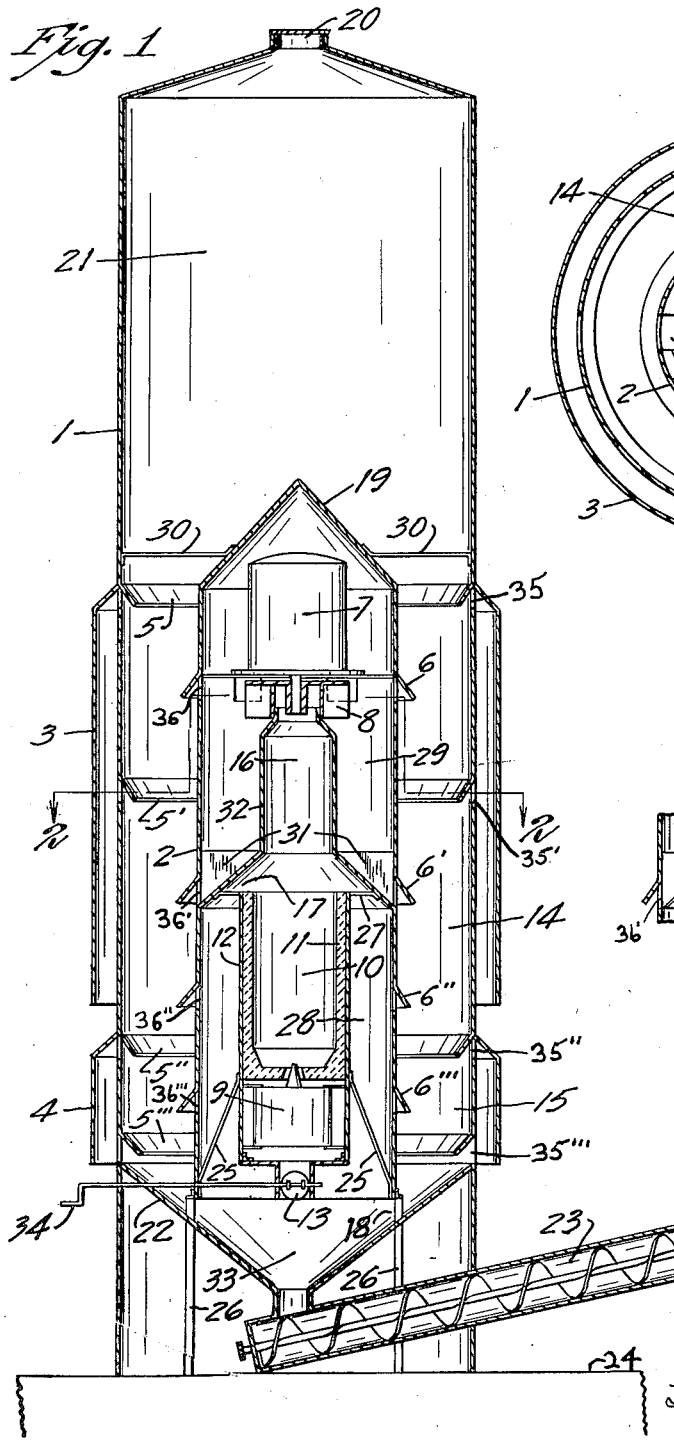
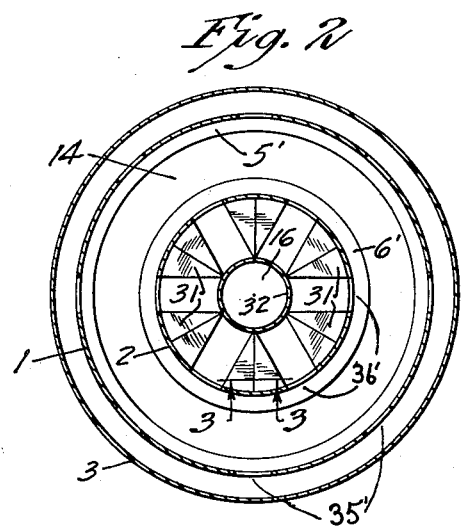
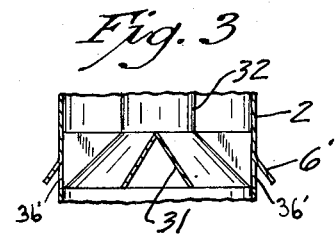
INVENTOR.
Lester V. Molenaar Patented Oct. 6, 1953

2,654,590

UNITED STATES PATENT OFFICE 2,654,590

GRAIN DRIER

Lester V. Molenaar, Lake Lillian, Minn.

Application March 26, 1951, Serial No. 217,470

9 Claims. (Cl. 263—30)

This invention relates to driers and more particularly to corn and grain driers.

It is an object of this invention to provide a drier cylindrical in shape, using flanges bolted or otherwise secured to the inner and outer walls, instead of the conventional ducts for supplying hot air to the grain, which shall produce a stirring action of the grain, and which shall be self cleaning, and which shall have a minimum of fire hazard.

Anoher object is to provide a drier which shall be cheap and easy of construction, and use a minimum of material.

Another object is to provide a drier in which the grain being dried is uniformly subjected to the drying and cooling conditions.

Another object is to provide means for subjecting the grain to the drying condition for a considerable time so that the grain can be uniformly dried to the center of each kernel.

Another object is to provide means for recirculating that portion of the exhausted air which is the hottest and has the lowest humidity.

Another object is to provide a drier in which the blower and burner are located so as to permit very short air paths, and to prevent heat loss to air not used for drying.

Another object is to provide a drier which does not require heat insulation of any of its parts.

Another object is to provide a uniform flow of grain in the drying and cooling chambers, the rate of which is simply controlled.

Another object is to provide means for supplying a draft for a burner without an extra blower, stack, or other equipment.

Another object is to provide a drier which is economical of fuel.

With these and other objects in view the invention will become apparent by reference to the drawings in which:

Fig. 1 is a vertical cross-sectional view of my drier.

Fig. 2 is a section on line 2—2 of Fig. 1, and

Fig. 3 is a section on line 3—3 of Fig. 2, showing the method of returning into the grain stream, any dust, or chaff which might enter the air stream in that portion of the drier.

Referring to Fig. 1, the outside cylinder wall 1, which may be constructed of hot rolled sheet steel, rests on foundation 24. The inner cylinder wall 2, rests on standards 26, which in turn rests on foundation 24. Outer flanges 5, 5', 5'', and 5''', are bolted or otherwise secured to the inside of outer cylinder wall 1. Inner flanges 6, 6', 6'', and 6''', are bolted or otherwise secured to the outside of inner cylinder wall 2. Said outer flanges and said inner flanges are placed at an angle to the horizontal, which causes the grain to readily run off and carry with it any dust and chaff. Said outer flanges and said inner flanges cause a stirring action of the grain. Said outer flanges and said inner flanges also cause the air flow to be evenly distributed throughout the circumference of the drier. Directly under the outer flanges are openings 35, 35', 35'', 35'''. Directly under the inner flanges are openings 36, 36', 36'', and 36'''. Said openings are spaced at regular intervals under each flange and are for the purpose of permitting the air to enter or leave from their respective flanges.

The burner 9 along with the combustion chamber 10, and the fire brick 11 are located in a cylinder 12, which cylinder is supported by standards 25 and braces 27. The burner 9 is a conventional one and is controlled by conventional means not shown. An air control 13, which is turned by crank 34, is provided to control the amount of air going through the combustion chamber 10. The top of the cylinder 12 is placed at a proper distance 17 from duct wall 32, so that a draft is provided for the burner through the functioning of the well known Bernoulli's principle. The duct 16 is for the purpose of directing the hot air into blower 8, which blower is powered by motor 7. Power is supplied to motor 7 through the use of conventional wiring and controls, not shown. Motor 7 is ventilated by conventional means, not shown. A cover 19 is provided for the inner cylinder 2, braced to the outer cylinder 1 through the use of braces 30.

A funnel shaped element 22 is placed just under the cooling chamber 15 to direct the grain into auger 23. The rate at which the grain is removed from the drier can be controlled by changing the speed of auger 23. This auger is powered by and the speed controlled by conventional means, not shown.

Within the upper portion of the drier is a storage chamber 21, and above said storage chamber a cover 20 to protect the drier and its contents from the weather. Around the outside of the hot portion of the drier a shield 3 is provided to direct the warm exhaust air around and down the outside of the outer cylinder wall 1. This prevents the cold outside winds from contact with the drier. Shield 3 also prevents rain and snow from entering the drier. A shield 4 is provided to keep the rain and snow from entering the lower portion of the drier.

In the central portion of the drier around the lower part of the duct wall 32, are arranged several V-shaped elements 31 for the purpose of directing any dust and chaff which might enter duct 29 back through openings 36' and thence into the grain. Fig. 2 illustrates more clearly the circular shape of the drier through line 2—2. The openings 35 are arranged around the circumference of the outer cylinder wall 1 at regular intervals. The openings 36' are arranged around the circumference of the inner cylinder wall 2.

Fig. 3 illustrates more clearly the use of the V-shaped elements to direct the dust and chaff from air duct 29 through openings 36' into the grain stream in chamber 14.

In operation chambers 33, 15, 14, and 21 are filled with grain to be dried through the top of the drier after removing cover 20. This filling can be done by any conventional means such as a portable elevator. Power is then supplied to motor 7, through the use of conventional wiring and controls, not shown. Blower 8 is now in operation being mounted directly on the shaft of motor 7. After the blower has come up to full speed the burner 9 is ignited by conventional means, such as electric gas ignition. The burner 9 is a conventional one with conventional controls which are not shown.

Cold air now enters openings 35" and 35"'. The outer flanges 5" and 5"' serve the purpose of allowing the cold air to pass through the grain in the cooling chamber 15, around the entire circumference of the drier. Of the cold air which has entered through the openings 35", one half passes through the grain and enters air duct 28 through openings 36". The second half passes through the grain and enters air duct 28 through openings 36"'. Of the cold air which has entered through openings 35"', one half passes through the grain and enters air duct 28 through openings 36"'; the second half of the cold air which has entered through openings 35"' passes through the grain and enters chamber 33 through opening 18. From chamber 33, a portion of the air passes through control 13, the burner 9, and is used for combustion and the balance proceeds to air duct 28. It is to be noted that the cold air in passing through the grain in chamber 15 serves the purpose of cooling the grain so that it can be safely stored.

The air in duct 28 now passes up in said duct cooling the surface of cylinder 12, and proceeds past the constriction space 17 at the top of cylinder 12, causing a draft for the burner in accordance with the well known Bernoulli's principle. The air at this point mixes with the products of combustion from burner 9 and is thus heated. The air now rising through air duct 16, and enters the suction side of blower 8. From blower 8, about one half of the heated air passes into drying chamber 14 through openings 36, the second half goes down through air duct 29, passes the V-shaped elements 31, and into the lower part of the drying chamber 14 through openings 36'.

One half of the heated air from opening 36 passes through the grain in the upper portion of drying chamber 14 and enters the space between outer cylinder wall 1 and shield 3 through openings 35. The second one half of the heated air from openings 35 passes through the grain in drying chamber 14, and enters the space between outer cylinder wall 1 and shield 3 through opening 35'. One half of the heated air from openings 36' passes through the grain in drying chamber 14, and enters the space between the outer cylinder wall 1 and shield 3 through openings 35'. The second half of the heated air from openings 36' passes through the grain in the lower part of drying chamber 14 and enters air duct 28 through openings 36" to be recirculated. The heated air in passing through the drying chamber heats the grain and removes moisture from the grain. That part of the air which is recirculated has passed through the dryest grain and has thus the lowest humidity and the highest temperature of the air which has passed through the drying chamber 14. It is to be noted that the exhaust air is caused by shield 3 to pass over the outside part of outer cylinder 1 to keep the cold outside winds from contact with said outer cylinder and thus prevent excessive heat loss.

After filling and starting the dryer in the aforementioned manner, auger 23 is started, said auger being powered and the speed controlled in any conventional manner. The purpose of auger 23 is to convey the grain from the lower part of chamber 33 at a predetermined rate to any convenient place of storage. During the first period of operation the grain is still wet so it is returned to the storage chamber 21, until the grain has been dried to a required moisture content, this being a common practice with conventional driers. As the grain is removed from the lower part of chamber 33, the grain from the cooling chamber 15 moves by gravity through opening 18 to take the place of the grain removed from the chamber 33. This in turn causes a downward movement of grain in drying chamber 14 and storage chamber 21. Storage chamber 21 requires only periodic filling with wet grain.

As the grain moves down in the drying chamber 14, it is dried by the hot air passing through it. The flanges stir the grain so that it is uniformly subjected to the drying condition. As the grain passes from flange 5 to flange 6 the temperature of the grain is gradually increased. From flange 6 to flange 5' the temperature of the grain is lowered due to the evaporation of moisture into the heated air. From flange 5' to flange 6' the temperature of the grain is again raised. From flange 6' to flange 6" the temperature is again lowered due to the evaporation of moisture into the heated air. The grain is thus at a point of maximum temperature for only a short period of drying time and a high initial temperature can be used without damage to the grain. In cooling chamber 15 the grain is cooled by the incoming air which air is then further heated and used for drying.

It is to be noted that any dust and chaff which enters air duct 29 passes over the V-shaped elements 31, and reenters the grain through openings 36'. Any dust and chaff which might enter air duct 28 passes into the grain in chamber 33. There is no fire hazard due to a collection of dust or chaff, and the drier is self-cleaning, and requires no moving parts for dust and chaff removal.

The shape of the drier makes it very compact, permits of very short ducts, and makes unnecessary heavy braces for support. The burner with its combustion chamber being located in the center of the drier does not have heat losses to any air not used in drying. Flanges 5, 6, 5', 6', and 6", are spaced vertically far enough apart, and the quantity of air used, and the temperature of the heated air used are chosen so that the exhaust air from openings 35 and 35' is nearly 100% humidity. During most of the drying time the grain is subjected to conditions of high relative humidity so the drying rate is slow and the grain has a chance to dry uniformly to the center of each kernel and without damage due to cracking of the kernels.

To further illustrate the operation of my drier an example of operation conditions is given, altho these conditions may vary widely with the humidity of the outside air, the temperature of the outside air, the moisture content of the grain, the amount of moisture reduction desired, the capacity of the drier desired, and other variable conditions. The invention is not to be limited to this example.

The temperature of the heated air may be 180° F. to 280° F. in air duct 16. The motor 7 may be a five horse motor. The blower 8 may have a capacity of 3500 cubic feet of air per minute. The burner 9 may have a capacity of ten gallons of number three fuel oil per hour. The diameter of the outer cylinder wall 1 may be seven feet and the diameter of the inner cylinder wall 2 may be four feet, leaving the drying chamber 14 and cooling chamber 15 a width of eighteen inches. The height of the drier may be 24 feet. The drying rate may be forty to a hundred and fifty bushels per hour. The vertical distance between the flanges 5, 6, 5', 6', 6'', 5'', 6''', 5''' and the opening 18 may be one to two feet.

It is obvious that my invention may take widely different forms from those illustrated and it is to be limited in scope only as defined in the following claims. The word "grain" used in the claims will include within its meaning corn and other materials having particle structure resembling in size that of grain. The word "flange" in the claims is defined as a strip of metal or other material extending around the entire circumference of the cylinder wall sloping downward at an angle sufficient to produce the self cleaning and deflection action described in the above specification or extending a sufficient distance around said circumference to produce the results described above.

What I claim is:

1. In a grain drier, an inner cylinder, an outer cylinder, a plurality of stirring flanges attached to the outside of said inner cylinder, a plurality of stirring flanges attached to the inside of said outer cylinder, a first opening in said inner cylinder directly under one of said first mentioned flanges, a second opening in said outer cylinder directly under one of said second mentioned flanges, a burner having combustion gases secured in the center of said inner cylinder, means for passing a column of grain at a predetermined rate between said inner cylinder and said outer cylinder over said stirring flanges, and a blower for drawing air past said burner, and forcing said air and said gases through said first opening, said column of grain, and out said second opening.

2. In a grain drier, an inner cylinder, an outer cylinder, a plurality of stirring flanges extending around the outer circumference of said inner cylinder, a plurality of stirring flanges extending around the inside circumference of said outer cylinder, a first opening in said inner cylinder directly under one of said first mentioned flanges, a second opening in said outer cylinder directly under one of said second mentioned flanges, a burner located in the center of said inner cylinder, a storage chamber in the upper portion of said drier, means for periodically filling said storage chamber with grain, means for passing a column of said grain at a predetermined rate between said inner and said outer cylinder, and a blower for drawing air past said burner, and forcing said air through said first opening, said column of grain, out said second opening.

3. In a grain drier, an inner cylinder, an outer cylinder, a plurality of flanges extending around the outside circumference of said inner cylinder, a plurality of flanges extending around the inside circumference of said outer cylinder, a first opening in said inner cylinder directly under one of said first mentioned flanges, a second opening in said outer cylinder directly under one of said second mentioned flanges, a burner having combustion gases secured in the center of said inner cylinder, means for passing a column of grain at a predetermined rate between said inner cylinder and said outer cylinder, a blower for drawing air past said burner, and forcing said air and said gases through said first opening, said column of grain, out said second opening, said means comprising a funnel shaped element under said column, an opening in the center of said element, and means for removing said grain from said last mentioned opening at a predetermined rate.

4. In a grain drier, an inner cylinder, an outer cylinder, a plurality of flanges secured around the outside circumference of said inner cylinder, a plurality of flanges secured around the inside circumference of said outer cylinder, a first opening in said inner cylinder directly under one of said first mentioned flanges, a second opening in said outer cylinder directly under one of said second mentioned flanges, a burner having an inner wall and an outer wall located in the center of said inner cylinder, means for passing a column of said grain at a predetermined rate between said inner cylinder and said outer cylinder, and a blower for drawing air past said outer wall of said burner, and forcing said air through said first opening, said column of grain, out said second opening.

5. In a grain drier, an inner cylinder, an outer cylinder, a first flange secured around the outside circumference of said inner cylinder, a second flange secured around the inside circumference of said outer cylinder, a first opening in said inner cylinder directly under said first flange, a second opening in said outer cylinder directly under said second flange, a burner having combustion gases located in the center of said inner cylinder, means for passing a column of said grain at a predetermined rate between said inner and said outer cylinders, an air duct over said burner, a second air duct over said first opening, a blower for drawing air past said burner, through said first duct and forcing said air and said gases through said second duct, said first opening, said column of grain, and out said second opening, and a plate in said second duct for guiding dirt accumulating in said second duct into said column of grain.

6. In a grain drier, an inner cylinder, an outer cylinder, a plurality of flanges secured around the outside circumference of said inner cylinder, a plurality of flanges secured around the inside circumference of said outer cylinder, a first opening in said inner cylinder directly under one of said first mentioned flanges, a second opening in said outer cylinder directly under one of said second mentioned flanges, a heat insulating shield surrounding said outer cylinder, a burner secured in the center of said inner cylinder, means for passing a column of grain at a predetermined rate between said inner cylinder and said outer cylinder, and a blower for drawing air past said burner, and forcing said air through said first opening, said column of grain, out said second opening, and between said outer cylinder and said shield.

7. In a grain drier, an outer cylinder, an inner cylinder, a first flange attached to the inside of said outer cylinder, a second flange attached to the outside of said inner cylinder at a lower height than said first flange, a third flange attached to the inside of said outer cylinder at a lower height than said second flange, a fourth flange attached to the outside of said inner cylinder at a lower height than said third flange, a fifth flange attached to the outside of said inner cylinder at a lower height than said fourth flange, a sixth flange attached to the inside of said outer cylinder at a lower height than said fifth flange, a seventh flange attached to the outside of said inner cylinder at a lower height than said sixth flange, an eight flange attached to the inside of said outer cylinder at a lower height than said seventh flange, a plurality of openings in said inner cylinder directly under the point of attachment of each of said flanges attached to said inner cylinder, a plurality of openings in said outer cylinder directly under the point of attachment of each of said flanges attached to said outer cylinder, a burner secured coaxially within the lower part of said inner cylinder, means for passing a column of grain at a predetermined rate between said inner cylinder and said outer cylinder over said flanges, a blower secured coaxially within said inner cylinder above said burner, a first duct connected between said burner and said blower, a second duct connected between said blower and the upper section of said inner and outer cylinders, and means for rotating said blower to produce a flow of air through the grain in the lower portion of said column, past said burner, through said first duct, said blower, said second duct, and said grain in the upper portion of said column.

8. Apparatus according to claim 7, wherein a storage chamber consisting of an extension of the upper part of said outer cylinder, and a cover for said chamber is included.

9. Apparatus according to claim 7, wherein means are included for returning dust and chaff from said second duct into said grain to reduce the fire hazard.

LESTER V. MOLENAAR.

References Cited in the file of this patent
UNITED STATES PATENTS

| Number | Name | Date |
|---|---|---|
| 676,681 | Mallinson | June 18, 1901 |
| 685,336 | Leroy et al. | Oct. 29, 1901 |
| 731,682 | Hillig | June 23, 1903 |
| 745,689 | Tanner et al. | Dec. 1, 1903 |
| 746,822 | Gorham | Dec. 15, 1903 |
| 1,482,812 | Roberts | Feb. 5, 1924 |
| 1,629,921 | Mansfield | May 24, 1927 |
| 2,245,664 | Gronert | June 17, 1941 |
| 2,492,132 | Payne et al. | Dec. 27, 1949 |
| 2,520,871 | Wright | Aug. 29, 1950 |
| 2,548,262 | Hintz | Apr. 10, 1951 |

FOREIGN PATENTS

| Number | Country | Date |
|---|---|---|
| 674,397 | France | Oct. 21, 1929 |